United States Patent Office 3,370,083
Patented Feb. 20, 1968

3,370,083
CATALYTIC PROCESS FOR THE
PREPARATION OF NITRILES
Natale Ferlazzo, Giorgio Caporali, Nicola Giordano, and Paolo Marinozzi, Milan, Italy, assignors, by mesne assignments, to Montecatini Edison S.p.A., a corporation of Italy
No Drawing. Filed Aug. 13, 1963, Ser. No. 301,880
Claims priority, application Italy, Aug. 23, 1962,
26,538/62
7 Claims. (Cl. 260—465.3)

The present invention relates to a new process for preparing nitriles. The inventive concept also includes a catalyst particularly suitable for this process. More particularly, the invention relates to an improved process for the production of unsaturated nitriles using catalysts containing a heteropolycompound.

In the previous technical literature other processes have already been described in which an olefine is reacted with ammonia and oxygen in the presence of specific catalysts, in order to obtain unsaturated nitriles.

The known catalysts comprise different elements, mainly as combinations of their oxides or in the form of salts, such as bismuth, tin and antimony salts of the molybdic, phosphomolybdic and phosphotungstic acids, the molybdenum, cobalt and tellurium oxides; the molybdenum and tellurium oxides; the tungsten and tellurium oxides; the tellurium oxide; the molybdenum and chromium oxides; the molybdenum, arsenic and bismuth oxides, the mixtures of molybdenum, vanadium, chromium, manganese, cobalt, nickel, copper, iron, tellurium, selenium, bismuth, silver, gold, aluminum, and so forth, oxides; phosphoric acids activated by different elements such as those above mentioned; the mixtures of bismuth, phosphorus, vanadium, manganese, chromium, iron, cobalt and nickel oxides.

In general, the known processes are not fully satisfactory. Among their disadvantages is relatively low selectivity, that is, low yields of the desired unsaturated nitrile, coupled with the formation of large amounts of carbon oxides, and undesirable by-products such as unsaturated aldehydes, acids, ketones, saturated nitriles, hydrogen cyanide.

The by-products obviously represent a loss of substance besides making the recovery of the desired unsaturated nitrile, in a pure state more difficult.

A further disadvantage of the known processes is, in general, a low conversion of the fed olefine for each passage, hence the catalyst has a low output with the result that a re-cycling of the olefine is required.

Still another disadvantage of the known processes is represented by the side-reactions of the ammonia, which largely take place when using the known catalysts at the working temperatures. Moreover in the known processes, in order to obtain good selectivity, large amounts of ammonia in relation to the olefine are required.

Still another disadvantage of the known processes is the relatively long contact time which is required for obtaining a satisfactory conversion of the olefine feed.

A further disadvantage is the limited life of the catalysts used in the known processes, which makes necessary frequent regenerations of the deactivated catalyst.

Thus, the object of the present invention is to provide a process for the production of unsaturated aliphatic nitriles with high yields, by reacting an olefine with oxygen and ammonia, without however the attendant disadvantages of the known processes.

Another object of the present invention is to provide a process and a catalyst which allow higher yields of unsaturated nitrile than hitherto obtainable through this type of reaction.

A further object of this invention is to provide a process and a catalyst which allow a higher conversion for each passage with relatively short contact times and without reducing the selectivity of the reaction.

Still another object of this invention is to provide a process and a catalyst with which to obtain the maximum possible utilization of the ammonia fed in, by avoiding its consumption by the action of side-reactions.

Still a further object of this invention is to provide a catalyst so improved, that it can be used continuously without any loss of activity and that in consequence thereof, it does not require any frequent regeneration.

The process according to the present invention offers considerable advantages in comparison to the known processes. In fact, it has been found that, with the new catalytic complexes according to the present invention, it is possible to obtain high conversion of the olefine without, however, reducing the yield of unsaturated nitrile obtained in the reaction.

A particularly important advantage lies in the high degree of selectivity shown by the catalysts according to the present invention. The term "selectivity" is used to indicate that side-reactions take place only to a very small extent and that, therefore, only extremely small quantities of by-products and carbon oxides are formed.

The absence of side-reactions, which are highly exothermic, makes the thermic control of the process a relatively simple matter, thus avoiding the necessity of complicated equipment and/or technique for dissipating the intense reaction heats.

It may easily be appreciated how such advantage results in a working ease so far known in this particular field.

Another advantage consists in extremely high conversions that are attained utilizing the process according to the present invention.

Still another advantage consists in the short catalytic contact time required, which provides a higher productivity by the catalyst.

Still a further advantage lies in the high resistance of the catalyst to deactivation; in consequence whereof the catalysts according to the present invention have a long life without any appreciable loss of activity.

The present invention consists in a process for obtaining an unsaturated nitrile, by reacting an olefinic hydrocarbon in the gaseous phase with gaseous ammonia and gaseous oxygen, or oxygen containing gases, on a catalytic complex, which will be described in detail further on, at temperatures ranging from 300° C. to 600° C., under a substantially atmospheric pressure.

The catalytic complexes according to the present invention can be considered as resulting from the salification of a particular heteropolycompound with an element chosen from the group consisting of bismuth and tellurium.

As it is known, the heteropolyacids are considered as resulting from two or more molecules of two or more different acids by elimination of water molecules (heterodiacids, heterotriacids, heterotetracids); more particularly they may be considered as resulted from the union of a definite number of molecules of acid anhydrides, particularly $WO_3$, $MoO_3$ and $V_2O_5$ (usually defined as co-ordinated elements) with molecules of a second acid that supplies the central atom (usually defined as coordinating element) of said polyanionic complex.

The catalytically active heteropolyacids according to the present invention, are just those heterotriacids which have as coordinating element an element of the rare earths of the series of the lanthanides, such as cerium, and of the series of the actinides, such as thorium, and which have as coordinated elements molybdenum and vanadium. Such heteropolyacids correspond to the following formulae:

$$H_8Ce Mo_{10}V_2O_{41}$$
$$H_8ThMo_{10}V_2O_{41}$$

In order to obtain catalysts according to this invention, these heterotriacids are salified with one of the elements chosen from the group consisting of bismuth and tellurium. The salification is effected by reacting a compound of the salifying element with the heteropolyacid or with the ammonium salt of said heteropolyacid.

According to this invention, in the salification of the heteropolyacid or of its ammonium salt as excess or a deficiency in the compound of the salifying element with respect to the theoretical quantity required can also be used. Surprisingly it was found that also the catalyst prepared with an excess or a deficiency in the salifying element are quite effective for executing the process according to the invention.

Consequently, the catalysts suitable for operating according to the process according to the present invention may be conveniently represented by the following formulae:

$$Me_xCe_{10}Mo_{100}V_{20}O_y$$
$$Me_xTh_{10}Mo_{100}V_{20}O_y$$

wherein Me represents an atom of an element chosen from the group consisting of bismuth and tellurium, $x$ represents a number comprised within the interval from about 1 to about 180, $y$ represents a number that assumes particular values comprised between 370 and 730, depending on the valency status of the other elements (Ce, Th, Mo, V, Me) and depending on the values of $x$.

The catalytically active heteropolycompounds may be used by themselves or mixed with each other.

These heteropolycompounds proved to be both effective as such, as well as in admixture with a suitable support. Furthermore, it was found that they are effective both when using them in a fixed as in a fluid bed.

The process according to the present invention may be used with aliphatic olefines having straight or branched chains with at least three carbon atoms, and at least one methylic group in an α-position with respect to the double bond.

The process is particularly effective and gives excellent yield when propylene is used for obtaining acrylonitrile and isobutylene for methacrylonitrile.

The olefine may be used in the pure state; however, it has been found that the reaction succeeds equally well when the olefines are diluted with paraffinic hydrocarbons which do not react under the conditions of the process and that behave at all effects as inert diluents.

The oxygen necessary for the reaction may be supplied either in the pure state or in the form of gases containing it, for instance, air. This latter embodiment offers some advantages deriving from the nitrogen that accompanies the oxygen, and which serves usefully as a diluent, as it will be seen further on.

Given the exothermic character of the reaction, it may be useful or even necessary to dilute the reacting gases with inert gaseous substances. Examples of such substances, whose use was found convenient in the process according to this invention, may be paraffinic hydrocarbons for instance those that may be found already mixed with the raw olefine used, nitrogen, carbon dioxide, steam, etc.

As mentioned above, the use of air instead of oxygen in the process supplies simultaneously nitrogen, which acts as an inert diluent. Even the olefine itself acts as an inert diluent when it is used in excess.

The type of the operational procedures, the quantity, etc., of diluent to be used in the process of this invention depend obviously on different factors; for instance: on the reaction conditions, on the amount of the achieved conversion and, consequently, on the quantity of developed heat, on the selectivity in the sense that where there is a low selectivity the main reaction is accompanied by side reactions which, being more exothermic than the main reaction, require greater quantities of diluent for the thermal control of the process; and at last on the technique applied, that is, whether the reaction is effected on a fixed or on a fluid bed, as well as on the equipment used.

Thanks to the exceptionally high selectivity of the catalysts according to the invention, which strongly inhibit the highly exothermic side-reactions, the use of a supplementary diluent in the fed gaseous mixture may be reduced to very low values, or even omitted altogether, especially when air is used, since the nitrogen present in the air in general would be sufficient for controlling the exothermicity of the side-reactions.

The quantity of oxygen or of the gases containing it, used in relation to the quantity of employed olefine, may vary within very wide limits.

In the preferred embodiment the molar ratio between the oxygen and the olefine is comprised between 0.5 and about 2.5. The quantity of ammonia to be used with respect to the olefine may vary within wide limits. However, the preferred molar ratio between the ammonia and the olefine lies between about 0.3 and about 2.

In order to achieve a maximum of the ammonia utilization, the latter's quantity should be sufficient at least for completing the reaction; on the other hand, a great excess of ammonia would result in a waste of the ammonia itself.

It has been noted that certain gaseous mixtures of olefines, oxygen and ammonia, characterized by specific ratios of the of the components may behave as explosive mixtures. However the process according to this invention is operative also within the limits represented by said explosive mixtures.

The high selectivity of the catalyst according to this invention allows the maximum possible utilization of the ammonia present in the reaction, so that, in order to ensure a complete reaction, only a small excess of ammonia with respect to the reacting olefine will be required.

While the reaction is generally effected with excellent results under atmospheric pressure, it can also be carried out under pressure higher than atmospheric pressure.

The process object of the present invention may be carried out at temperatures ranging from about 300° C. to about 600° C.; however, temperatures lying between 400° C. and 550° C. are preferred because at such temperatures the reaction rate is so high that high conversions are achieved also with relatively short contact times, as it will be seen hereunder and as it will be illustrated by the examples given further on.

The contact time (expressed as the time during which a volume unit of the gaseous mixture fed in, measured under the average conditions of temperatures and pressure existing in the reactor, comes into contact with an apparent volume unit of the catalyst) may vary within wide limits, for instance from 0.05 to 20 seconds, but it has been found that, thanks to the high activity of the catalyst, contact times smaller than 1 second are sufficient for obtaining a high conversion, so that the time range preferred for the execution of the process according to this invention lies between about 0.1 and about 3 seconds.

The heteropolycompounds used as catalysts in the process according to the present invention may be obtained in the following way; first the free heteropolyacid or its ammonium salt is prepared by following the general methods described by the specialized literature for their preparation. This heteropolyacid or its ammonium salt is then reacted with a compound of the desired salifying element in a liquid reaction medium and in the presence of small quantities of a strong acid.

The salifying element containing compounds are, according to the invention, oxides, hydroxides or salts of organic and inorganic acids of bismuth and tellurium preferably soluble in at least a solvent chosen from the class consisting of water, alcohols, ethers and esters.

The two reactants, that is the heteropolyacid or the ammonium heteropolysalt and the salifying element containing compound are reacted in a stoichiometric quantity in order to obtain as the reaction product the heteropolysalt of the desired element; it is, however, also possible to use an excess or a deficiency with respect to the theoretical value of the compound of the salifying element. In any case, the catalysts prepared by using an excess or a defiiciency of this reactant, are comprised within the limits defined by the formulae previously quoted.

The reaction may be effected between the solution or the suspensions in suitable solvents of the two reactants, depending on their solubility. The preferred solvent is water, though also other solvents may be used, such as oxygen containing organic solvents and particularly alcohols, ethers, and esters. The reaction is effected in the presence of strong mineral acids and in particular, nitric acid.

The conditions at which the reaction is carried out (for instance temperature, stirring, order of feeding of the reactants etc.) are not critical for obtaining catalysts usable in the process according to the invention.

According to another embodiment it is possible to react the compound of the salifying element with the ammonium heteropolysalt in the same reaction medium in which said ammonium heteropolysalt has been obtained. Such embodiment is carried out by mixing first the solution of a salt or of an acid containing the coordinated elements with a solution of an acid or a salt containing the coordinating elements, and by adding then to the mixture thus obtained the solution of a compound of the salifying element.

Anyhow obtained, the catalyst may be either used alone, that is without any support, or it may be conveniently supported on a suitable carrier.

In case it is not desired to make use of a support, the product of the catalyst preparation reaction is evaporated up to dryness, for instance by heating the catalyst up to 110° C., and it is subsequently activated by heat.

The activation consists in heating the catalyst at a temperature lying between 400° C. and 600° C. for a period of from 5 to 20 hrs. The activation temperature must be equal to or higher than the temperature at which the catalyst will be operating in the process for obtaining the nitriles.

To the catalyst may be given a particular shape and/or size through grinding, sieving, pressing into tables, etc. as it is well known to any expert of the art. Also the well known "spray-drying" technique can be conveniently applied.

Though the catalysts according to the invention may be used without any support, it is preferable to use such supports which contribute to increase the effectiveness and the life of the catalyst itself.

Suitable supports for this purpose may be silica, alumina, Alundum, fireclays or other like materials, both in the form of powders of suitable size or of tablets, pellets, granules or in the shape of a gel, such as silica or alumina gel.

Among the supports proved particularly convenient those which show a so-called "open-structure" for instance the silica aerogels. The techniques most suitable for depositing the catalysts on supports are well known to the experts of the art and, on the other hand, they go beyond the field of this invention. They are, however, easily applicable to the catalysts conforming to the present invention.

Also the catalyst deposited on a support, like the one who is not, must be activated by the action of heat according to the procedures above described.

As it is known to any expert of the art, in the course of the preparation, easily decomposable organic substances such as oils, glycerol, polyvinyl acetate, polyvinyl alcohol, which by decomposition during the activation phase give to the catalyst a higher porosity degree can be added.

Hereunder some examples illustrating the inventive concept of the invention will be given.

In the given examples the percentage of the gaseous feeding mixture are given by volume, while the percentages in yield are referred to the moles.

The results given in the examples are inferred both by means of chromatographic analysis as well as by quantitative, volumetric and gravimetric analysis or by gas-volumetric analysis.

Example 1

A catalyst based on the tellurium salt of the ceric-molybdovanadic acid is prepared in the following way: 30.4 gr. of ammonium paramolybdate are dissolved in 125 ml. of water and the solution then passed over a strong acid cation-exchange resin bed (for instance such as those known under the commercial name of "Amberlite IR 120.") To the solution thus obtained 11 gr. of sodium meta-vanadate are added, and then it is brought to the boiling point. Thereupon a solution of 9 gr. of ammonium ceric nitrate in 100 ml. of water or a solution of 9 gr. of cerium carbonate in water containing ammonium carbonate is added dropwise; the whole is then heated for one hour under reflux and then filtered. The filtrate is then concentrated and an extraction in the presence of strong acid with ethylic ether is carried out. The etheric solution of the heterotriacid thus obtained is then evaporated to dryness and to the residue is then added enough water for dissolving it; the solution is then evaporated until crystallization sets in. The product thereby obtained corresponds to the formula:

$$H_8[CeMo_{10}V_2O_{41}]$$

In order to obtain the tellurium salt of said heterotriacid, 0.1 gr. mole of this, dissolved in water, are salified with 0.2 gr. atoms of tellurium, that is they are added to 25.5 gr. of metallic tellurium dissolved in nitric acid; 210 gr. of a silica aerogel (known under the commercial denominations of: Aerosil Cab-o-Sil, Santocel) which acts as a support, are then added. The mass thereby obtained is then dried by heating it up to 110° C. and finally activated by heating at 490° C. for 12 hrs.

After a suitable subdivision of the catalyst so that it may work as a fluid bed, the catalyst is put into a reactor and over it a gaseous mixture composed of 8.8% of propylene, 63.1% of air, 6.2% of ammonia and 21.9% of steam is allowed to flow.

The contact time of this mixture with the catalyst is of 0.6 second, the temperature is maintained constant at 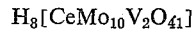 423° C.

The yield in acrylonitrile is of 80.1% with respect to the converted propylene; at the same time acetonitrile and acrolein in the respective amounts of 3.3% and 1.8% are formed.

Example 2

A catalyst based on tellurium ceric-molybdo-vanadate supported on a silica aerogel is prepared by pouring on 180 gr. of said aerogel (known under the commercial denominations of Aerosil, Cab-o-Sil, Santocel) a solution of 176.5 gr. of ammonium paramolybdate, a solution of 54.8 gr. of ammonium ceric nitrate, a solution of 23.4 gr. of ammonium metavanadate and a solution obtained by dissolving 1.3 gr. of metallic tellurium in nitric acid.

The whole is then dried and the catalytic mass thus obtained is activated by heating same at 510° C. for about 12 hrs.

After reduction to the desired size, the catalyst is used as a fluid bed in a suitable reactor at a temperature of 478° C.

On this catalyst a gaseous mixture containing 8.5% of propylene, 62.5% of air, 4% of ammonia and 25% of steam is allowed to pass, with a contact time of 0.6 second.

From the analysis of the products it is found that 71% of the propylene consumed was transformed into arcylonitrile, 5.4% into acrolein, 1.1% into hydrogen cyanide and 15.7% into carbon-oxides.

*Example 3*

A catalyst based on the bismuth salt of ceric-molybdo-vanadic acid is prepared in the following way: to the aqueous solution of the free heterotriacid (0.1 mole), prepared as described in Example 1, is added an aqueous solution of 129 gr. of bismuth nitrate acidified with 38 cc. of nitric acid and 26.8 gr. of a silica aerogel ("Aerosil," "Cab-o-sil," "Santocel").

The mass thus obtained is then spray-dried in a suitable equipment of the known type; thereby obtaining directly the catalyst in a finely subdivided status, suitable for use as a fluid bed.

After activation by heating at 540° C. for about 12 hrs., the catalyst is put into a reactor and brought into contact with a gaseous mixture containing 8.2% of propylene, 62.1% of air, 5.7% of ammonia and 24% of steam.

The temperature is maintained at 455° C., while the contact time is 0.6 second.

It was found that 71.5% of the converted propylene is transformed into acrylonitrile, 5.9% into acetonitrile and 1.3% into acrolein.

*Example 4*

A catalyst based on ceric-molybdo-vanadate of bismuth is prepared in the following way: to the aqueous solution of 0.1 mole of the ceric-molybdo-vanadic heterotriacid, prepared as in Example 1 is added an aqueous solution of 436 gr. of bismuth nitrate acidified with nitric acid and then 390 gr. of silica aerogel.

The mass thus obtained is dried, then activated by a prolonged heating at 550° C. and finally subdivided into a size suitable for its use as a fluid bed.

The catalyst thus prepared, is then brought into contact in a reactor, at a constant temperature of 490° C. and for a contact time of 0.8 second, with a gaseous mixture consisting of 8.9% of propylene, 7.1% of ammonia, 66.7% of air, 0.5% of propane and 16.8% of steam.

It is found that 66.1% of the propylene introduced is converted, and that 84.2% of the converted propylene is transformed into acrylonitrile, while only 2.9% of it is transformed into acetonitrile and only traces of acrolein are formed.

*Example 5*

Two catalysts herein designated cat. A and cat. B, both based on the bismuth salt of ceric-molybdo-vanadic acid, and different from each other for the different concentration of the catalytically active compound with respect to the support, are prepared as follows:

On 33 gr. of a silica aerogel for the cat. A and on 8.5 gr. of a silica aerogel for cat. B, a warm aqueous solution of 35.3 gr. of ammonium paramolybdate, a solution of 4.7 gr. of ammonium vanadate, an aqueous solution of 0.02 gr. mole of ammonium ceric nitrate and an aqueous solution of 87.3 gr. of bismuth nitrate acidified with nitric acid are poured.

The mixture thus obtained is evaporated to dryness and the mass thus obtained is activated by heating it at 540° C. for 12–18 hrs.

The catalyst, suitably subdivided, is used in a reactor operating according to the technique of the fluid bed.

The application conditions of the two catalysts and the results obtained are summarized in the following table:

|  | Cat. A | Cat. B |
|---|---|---|
| Volumetric composition of the gaseous mixture fed in, in percentage: | | |
| Propylene | 10.9 | 8.8 |
| Air | 80.4 | 65.5 |
| Ammonia | 8.7 | 7.1 |
| Steam | -------- | 18.6 |
| Contact time, in seconds | 0.85 | 0.8 |
| Reaction temperature, ° C | 502 | 502 |
| Transformed propylene, with respect to that fed in, percent | 74 | 73 |
| Percentage yield with respect to the transformed propylene: | | |
| Acrylonitrile | 82.5 | 84.4 |
| Acetonitrile | 3.3 | 3.1 |
| Acrolein | 0.9 | 1 |
| Propylene transformed in carbon oxide, with respect to the propylene fed, in percentage | 8.5 | 6.5 |

*Example 6*

On a catalyst prepared like that described in Example 4 and likewise used in a reactor operating according to the technique of the fluid bed, is made to pass a gaseous mixture composed of 9.6% propylene, 13.5% oxygen, 6.7% ammonia and 70.2% of steam.

The contact time of this mixture on the catalyst is 0.7 second; the temperature is maintained constant at 501° C. 60.6% of the propylene fed in is converted.

The yield of the acrylonitrile is 80% with respect to the propylene fed in, while that of the acetonitrile is 5.1%; only traces of acrolein are obtained. The carbon oxides formed amount to 7.3% of the fed propylene.

*Example 7*

A catalyst based on bismuth ceric-molybdo-vanadate is prepared as follows:

To the aqueous solution of 0.1 mole of ceric-molybdo-vanadic heterotriacid, prepared as in Example 1 is added a solution, which contains nitric acid, of 436 gr. of bismuth nitrate.

The mass is then taken down to dryness, then activated by heating it at 540° C. and finally subdivided so that it may be used as a catalytic fluid bed in a reactor.

Over this catalytic fluid bed a gaseous mixture consisting of 9.1% propylene, 6.3% ammonia, 66.4% air and 18.2% of steam is made to pass at a constant temperature of 463° C., for a contact time of 0.8 second.

It will be found that 64.4% of the propylene fed in is converted; with respect to this a yield in acrylonitrile of 78.9% is obtained, accompanied by 4.4% of acetonitrile and 4% of acrolein.

*Example 8*

Over the catalyst B, prepared as described in Example 5, a gaseous mixture composed of 5.9% isobutene, 8.1% oxygen, 3.5% ammonia and 82.5% vapour is made to pass.

The contact time of this mixture with the catalyst is of 0.58 second. The temperature is maintained constant at 425° C.

The yield in methacrylonitrile with respect to the isobutene consumed is 51%, simultaneously 15.9% of methacrolein is formed.

*Example 9*

A catalyst based on the bismuth salt of thorio-molybdo-vanadic acid is prepared as follows:

Firstly, free thoria-molybdo-vanadic heterotriacid is prepared proceeding in the same way as that described in Example 1 for the preparation of the ceric-molybdo-vanadic acid, of course with the difference that instead of the cerium nitrate or carbonate, 9 gr. of thorium nitrate in an aqueous solution are used.

To the aqueous solution of 0.1 mole of the free thorio-molybdo-vanadic heterotriacid thus prepared, is added a solution acidified with nitric acid of 129 gr. of bismuth nitrate, and on the mixture thus obtained, are poured 250 gr. of a silica aerogel (Aerosil, Santocel, Cab-o-Sil).

The whole is taken down to dryness by heating up to 110° C. and then the dry catalytic mass is activated by a prolonged heating at 540° C. for about 12 hrs.

The catalyst thus obtained is then crushed to the desired size so that it can be used as a fluid bed.

A gaseous mixture containing propylene, air, ammonia and vapour in the respective amounts of 8.6%, 61.5%, 4.3% and 25.6% is passed over the catalyst, for a contact time of 0.75 second.

It will be found that at the constant temperature of 456° C., 70.2% of the converted propylene will be acrylonitrile.

Example 10

A catalyst based on bismuth thorio-molybdo-vanadate is prepared as follows:

On 17.5 gr. of a silicon aerogel (known under the commercial names of Aerosil, Cab-o-Sil, Santocel), is poured a lukewarm aqueous solution of 70.6 gr. ammonium paramolybdate, an aqueous solution of 9.4 gr. of ammonium metavanadate, an aqueous solution of 22.1 gr. of thorium nitrate, an aqueous solution of 174.6 gr. of bismuth nitrate acidified with nitric acid. The mixture thus obtained is evaporated to dryness by heating up to 110° C., the solid catalytic mass is then activated by heating it for about 12 hrs. at 540° C.

After a suitable subdivision, the catalyst will be used as a fluid bed in a reactor into which is fed a gaseous mixture composed of 6.7% propylene, 63.7% air, 5.4% ammonia and 24.2% steam.

The temperature is maintained at 505° C., the contact time of the gaseous mixture on the catalyst is 0.6 second.

It will be found that 54.5% of the fed in propylene is converted. The yield in acrylonitrile with respect to the converted propylene is 80.2%, while the yield in acetonitrile is 3%.

8.5% of the propylene fed in is transformed into carbon oxides.

Example 11

A catalyst based on the tellurium salt of the thoriomolybdovanadic acid is prepared as follows:

Firstly is prepared free thoriomolybdovanadic heterotriacid by proceeding in the same way as that described in Example 8.

The free heterotriacid is salified with tellurium by adding to an aqueous solution of 0.1 mole of said heterotriacid a solution obtained by attacking 25.5 gr. of metallic tellurium with nitric acid; as a support 220 gr. of a silica aerogel are then added.

The mass thus obtained is then spray-dried and then activated by heating for 12 hrs. at 500° C.

Over the catalyst thus prepared is passed a gaseous mixture comprising 8.7% of propylene, 63.2% of air, 6.1% of ammonia and 22% of steam, regulating its quantity in such a way as to have a contact time of 0.85 second.

It will be found that at the constant temperature of 452° C. the yield in acrylonitrile with respect to the propylene which has reacted is 79.5%; that the acrylonitrile is accompanied by a highly reduced quantity of acetonitrile, equal to 1.8% of the reacting propylene.

We claim:
1. A process for preparing an unsaturated nitrile selected from the group of acrylonitrile and methacrylonitrile from an olefin selected from the group consisting of propylene and isobutylene respectively, comprising contacting in the gaseous phase at a temperature in the range of 300° to 600° C. and at a contact time of 0.05–20 seconds, a mixture consisting of said olefin, 0.5 to 2.5 moles of elemental oxygen per mole of olefin, 0.3 to 2 moles of ammonia per mole of olefin and an inert gaseous diluent with a catalytic system consisting of at least one heteropolycompound having the general formula:

$$Te_xCe_{10}Mo_{100}V_{20}O_y$$

where $x$ represents a number in the range from 1 to 180 and $y$ represents a number in the range from 370 to 730.

2. The process of claim 1 wherein the olefin is propylene.
3. The process of claim 1 wherein the olefin is isobutylene.
4. The process of claim 1 wherein the catalyst is deposited on catalytically inert support.
5. The process of claim 4 wherein the support is silica aerogel.
6. The process of claim 1 wherein the contact time is between 0.1 and 3 seconds.
7. The process of claim 1 wherein the temperature range is between 400° and 550° C.

References Cited
UNITED STATES PATENTS

| | | | |
|---|---|---|---|
| 2,734,072 | 2/1956 | Harris | 260—465.3 |
| 2,744,926 | 5/1956 | Koons | 260—465.3 |
| 606,693 | 7/1898 | Syssoyeff | 252—462 |
| 1,937,381 | 11/1933 | Bond | 252—462 |
| 2,854,473 | 9/1958 | Spaulding et al. | 260—465.2 |
| 2,904,580 | 9/1959 | Idol | 260—465.3 |
| 1,900,882 | 3/1933 | Lusby | 252—462 |
| 1,900,883 | 3/1933 | Lusby | 252—462 X |
| 2,378,209 | 6/1945 | Fuller et al. | 252—462 X |
| 3,173,957 | 3/1965 | McDaniel et al. | 260—465.3 X |
| 3,226,421 | 12/1965 | Giordano et al. | 260—465.3 |

JOSEPH P. BRUST, *Primary Examiner.*

CHARLES B. PARKER, *Examiner.*